Jan. 13, 1925.
G. SCHROEDER
1,522,913
MITER BOX
Filed Feb. 9, 1924
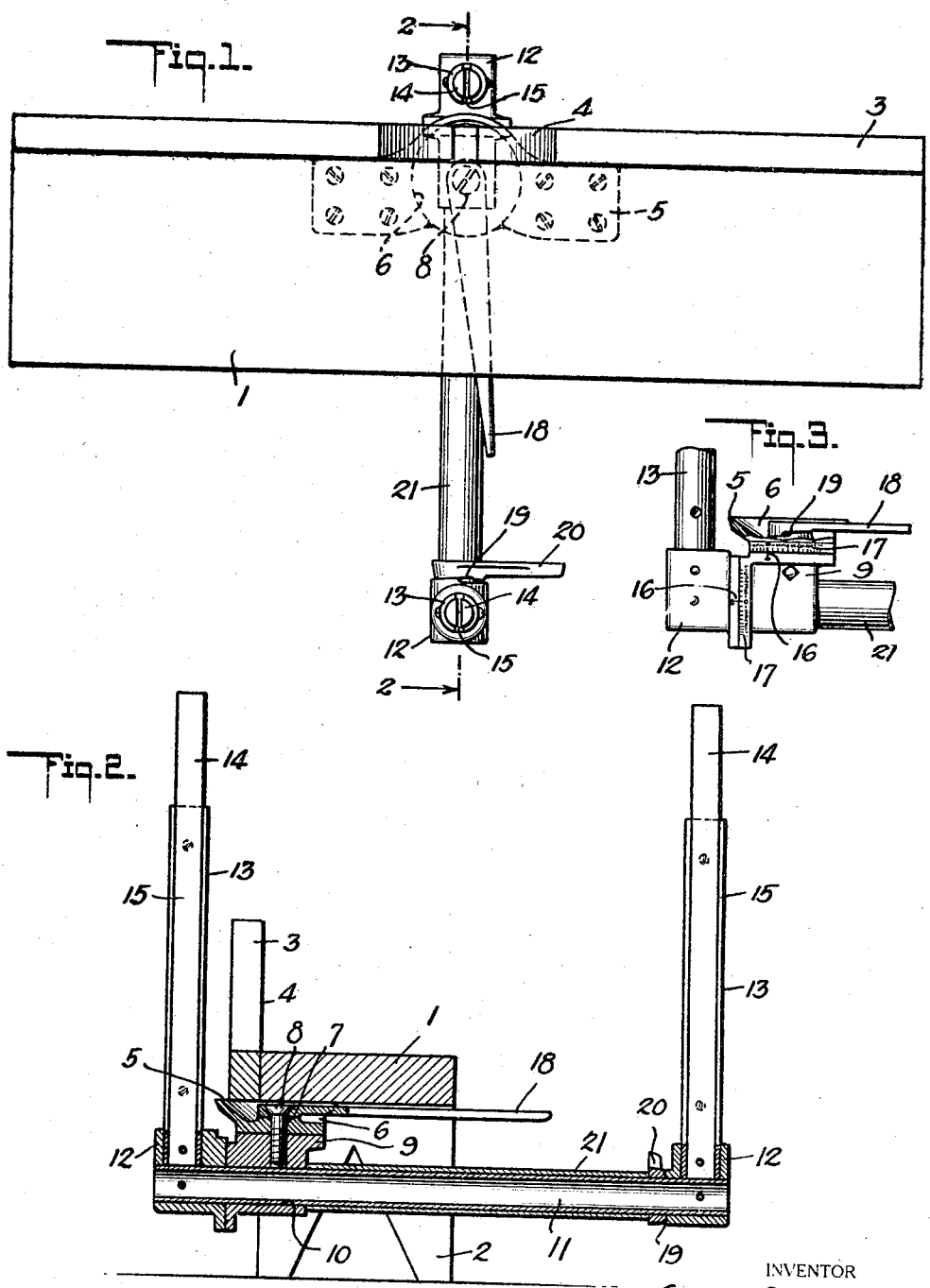
INVENTOR
GEORGE SCHROEDER
BY
ATTORNEY Patented Jan. 13, 1925.

1,522,913

UNITED STATES PATENT OFFICE.

GEORGE SCHROEDER, OF LOS ANGELES, CALIFORNIA.

MITER BOX.

Application filed February 9, 1924. Serial No. 691,785.

*To all whom it may concern:*

Be it known that I, GEORGE SCHROEDER, a citizen of the United States, residing at Los Angeles, in the county of Los Angeles and State of California, have invented certain new and useful Improvements in Miter Boxes, of which the following is a specification.

It is the object of this invention to provide a miter box, by the use of which, a cut may be made at any desired angular adjustment in both a vertical and a horizontal plane, and more particularly it is the object of the invention to provide a miter box having a work support, and upstanding saw guides in front and in rear thereof respectively, said guides being fixed relative to one another, so as to receive the blade of a saw and position the same with relation to the work upon the support, and being adapted to be turned as a unit to any desired vertical and horizontal angular adjustment with relation to the work support and the work carried thereby.

It is a further object of the invention to provide graduated scales for indicating both the vertical and horizontal angular adjustment of the saw guides with relation to the work support, said scales being graduated in accordance with usual carpenter's practice, to denote angles formed between the hypotenuse and base of right triangles in which the base has a fixed length of twelve units, and the perpendicular arm increases from one to twelve units.

It is a still further object of the invention to provide simplified locking means for both the horizontal and vertical angular adjustment of the saw guides, said locking means being positioned for operation thereof from the front of the work support and at points adjacent one another, so as to form an extremely convenient and practical device.

Further objects of the invention will be readily understood from the following description of the accompanying drawings, in which:

Fig. 1 is a top plan view of the miter box.

Fig. 2 is a vertical section on the line 2—2 of Fig. 1.

Fig. 3 is a side elevation, partly broken away, of the bearings for the saw guides.

The work support of the miter box comprises a base 1 having depending legs 2 for supporting the same in fixed position upon a work bench or the like, said base also having an upstanding back 3, which is notched midway of its length as shown at 4, in order to receive the blade of a saw, irrespective of its angular adjustment with relation to the work support.

Saw guides, fixed relative to one another, extend above the work support midway of its length and in front and rear thereof respectively, said guides being adapted to be turned as a unit, to any desired horizontal and vertical angular adjustment relative to the work support, so that the blade of a saw received in said guides, and extending across the work support through notch 4, will engage the work upon base 1 and against back 3, at any desired angle.

The mounting for the saw guides comprises a bracket 5 fixed to the underside of base 1 midway of its length and at the rear thereof, said bracket having a medial depression 6 with a vertical bearing 7 opening therethrough. A pivot screw 8 is threaded into a bearing block 9, with the projecting end of said screw journaled in bearing 7, so that the bearing block is rotatable upon a vertical pivot.

Bearing block 9 has a horizontal bearing 10 opening therethrough, and a rod 11 extends through said bearing and is journaled therein, with the ends of said rod extending an appreciable distance in front of the work support, and a short distance in rear thereof, respectively.

Radial sockets 12 are fixed on the respective ends of rod 11, and radially projecting tubes 13 are fixed in said sockets, with wooden rods 14 secured in said tubes and extending beyond the ends thereof, the rods 14 and tubes 13 being diametrically slotted throughout their lengths and in alinement with rod 11, as shown at 15, in order to form the saw guides for the miter box.

By the construction as thus described, it will be seen that the saw guides may be turned upon a vertical pivot to any desired adjustment with relation to the work support, by turning bearing block 9, which has the projecting screw 8 journaled in the vertical bearing 7; and in similar manner the saw guides may be swung to any angle upon a horizontal pivot, by turning rod 11 in the horizontal bearing 10.

Both the vertical and horizontal angular adjustment of the saw guides is indicated by graduated scales, one of which is provided at adjacent annular surfaces of bracket 5 and bearing block 9, and the other of which is positioned at adjacent annular surfaces of said bearing block and the radial socket 12 fixed upon the rear end of rod 11.

The scales comprise key markings 16 upon one of each of the cooperating annular surfaces, and graduations 17 in opposite directions from zero, upon the other of said cooperating surfaces. The parts are so arranged that alinement of the zero marks of the graduations with the key markings 16, will position the slotted saw guides perpendicular to both the base and the back of the work support, and alinement of successive markings of the graduations with the key markings, will turn the saw guides relative to the back and base of the work support, at angles computed in accordance with usual carpenter's practice, i. e., at angles formed between the hypotenuse and base of right triangles in which the base has a fixed length of twelve units, and the perpendicular of the triangle increases from one to twelve units in length. The graduations 17 may be numbered from 1 to 12 from zero, as an index to the angular adjustment denoted thereby.

Locking levers are provided for securing the saw guides in both their vertical and horizontal angular adjustment. As an instance of this arrangement, a locking lever 18 is pivoted on screw 8 between the head thereof and bracket 5, the adjacent surfaces of said lever and bracket forming annular cams 19, arranged so that by turning said lever the bearing block 9 will be either released or frictionally held in adjusted position with relation to bracket 5.

In similar manner a lever 20 is journaled on rod 11, preferably adjacent the socket 12 at the forward end of said rod, with a tube 21 mounted on said rod between the lever and bearing block 9, the adjacent surfaces of said lever and socket forming annular cams 19, whereby rod 11 is free for turning in bearing 10, or held in rotatably adjusted position in said bearing, by turning of said lever in opposite directions.

The lever 18 preferably extends forwardly from the work support, so that its operating end is adjacent lever 20, which is also at the front of the device, in order that both levers may be readily accessible.

In operation the saw guides may be locked or released by manipulating levers 18 and 20, and may be turned to any desired horizontal and vertical angular adjustment with relation to the work support, by turning bearing block 9 upon its vertical pivot, and also turning rod 11 in its horizontal bearing, the desired angular adjustments being obtained by alinement of the required markings of graduations 17 with the key markings 16 of the scales.

It will be noted that by the use of wooden rods 14 in tubes 13, the blade of a saw received in the slots formed in said rods, will abut against readily cut wooden surfaces only, thereby preventing such injury to the saw as results from contact against relatively hard, metallic surfaces.

It will be apparent that various changes may be made in the construction, combination, and arrangement of parts as thus described, without departing from the spirit of the invention.

What is claimed is:

1. The combination of a work support having a vertical bearing, a horizontal bearing provided with a pivot pin journaled in said vertical bearing, a locking lever journaled on said pivot pin, said lever having a cam surface adapted to bind said horizontal bearing in vertically pivoted adjusted position relative to said work support, a rod journaled in said horizontal bearing, saw guides fixed to and extending radially from said rod above said work support in front and in rear thereof respectively, and a locking lever journaled on said rod, said lever having a cam surface adapted to bind said rod in rotatably adjusted position in said horizontal bearing.

2. The combination of a work support having a vertical bearing, a horizontal bearing provided with a pivot pin journaled in said vertical bearing, cooperating scale markings on said vertical and horizontal bearings, a locking lever journaled on the pivot pin and projecting beyond the front of the work support, said lever having a cam surface adapted to bind said horizontal bearing in vertically pivoted adjusted position relative to said work support, a rod journaled in said horizontal bearing, cooperating scale markings on said rod and said horizontal bearing, saw guides fixed to and extending radially from said rod above said work support in front and in rear thereof respectively, a tube journaled on said rod in front of said horizontal bearing, and a locking lever journaled on said rod between said tube and the front saw guide, said lever having a cam surface adapted to bind between said tube and said front saw guide for holding said rod in rotatably adjusted position in said horizontal bearing.

3. The combination of a work support, a member pivoted to said work support, a cam rotatable relative to the axis of said pivotal mounting and adapted to bind said member and said work support in rotatably adjusted position relative to one another, a saw guide pivoted to said member on an axis at an angle to said first pivotal axis, and a cam rotatable relative to the axis of said last pivotal mounting and adapted to bind said saw guide and said member in rotatably adjusted position relative to one another.

4. The combination of a work support, a member pivoted to said work support, a cam rotatable relative to the axis of said pivotal mounting and adapted to bind said member and said work support in rotatably adjusted position relative to one another, a saw guide pivoted to said member on an axis at an angle to said first pivotal axis, a cam rotatable relative to the axis of said last pivotal mounting and adapted to bind said saw guide and said member in rotatably adjusted position relative to one another, scale markings on said saw guide and said work support, and cooperating scale markings on said pivoted member.

5. The combination of a work support, a member pivoted to said work support, a cam rotatable relative to the axis of said pivotal mounting and adapted to bind said member and said work support in rotatably adjusted position relative to one another, a saw guide pivoted to said member on an axis at an angle to said first pivotal axis, a cam rotatable relative to the axis of said last pivotal mounting and adapted to bind said saw guide and said member in rotatably adjusted position relative to one another, and means projecting in front of said work support for rotating the respective cams.

In testimony whereof I have affixed my signature to this specification.

GEORGE SCHROEDER.